Patented Aug. 14, 1945

2,382,397

UNITED STATES PATENT OFFICE 2,382,397

PREPARATION OF CAMPHENE FROM PINENE

William F. Carson, Jr., Brunswick, Ga., assignor to Hercules Powder Company, Wilmington, Del., a corporation of Delaware No Drawing. Application July 21, 1943, Serial No. 495,643

13 Claims. (Cl. 260—675.5)

This invention relates to improvements in terpene isomerization and more particularly, to a new catalytic process for the preparation of camphene from pinene.

Camphene is an important chemical of industry, from which many products of commerce are made, one of which is camphor. Many methods have been suggested in the literature for the preparation of camphene from bornyl chloride, each method attempting to produce a chlorine-free product. Attempts to produce chlorine-free camphene have led to the development of various one-step methods using a catalyst to promote the isomerization of pinene directly to camphene, thus eliminating the bornyl chloride stage. Many methods have been suggested using various types of catalysts, both organic and inorganic, as well as mineral to effect this one-step conversion of pinene directly to camphene. In all cases where organic or inorganic type catalysts are used, the yield of desirable product has been relatively low as, for example, in the neighborhood of about 15%. Of the mineral catalysts many are no better than the organic and/or inorganic types, while others permit yields of camphene as high as 50% but only after a comparatively long reaction period.

Now, in accordance with the present invention, a new catalytic process has been discovered wherein it has been found that the specific group of silicates known as the chlorites, will promote the isomerization of isomerizable terpenes. In particular it has been discovered that this specific group of silicates will effect the production of relatively high yields of pure camphene in a relatively short period of time when used as an isomerization catalyst in the presence of an isomerizable terpene.

The method in accordance with this invention is illustrated by the following specific examples, all parts and percentages being by weight unless otherwise specified:

Example I

A quantity of the mineral catalyst, prochlorite, was dried for one hour at 100° C. and then pulverized to a grain size of about 28 mesh. One part of this mineral catalyst was slowly added to 43 parts of alpha-pinene having a specific gravity of .8646 which was held at the reflux temperature until addition of the catalyst was complete. The mixture was refluxed gently for two hours, during which time the temperature of the reaction mixture had risen from 156° C–165° C. The mixture was cooled, filtered to remove the catalyst, and the filtrate fractionated. A yield of 60% of solid camphene was obtained, the remainder of the material being chiefly monocyclic terpenes.

Example II

The above procedure was repeated but penninite was used as the catalyst. A yield of 59% solid camphene was obtained.

Example III

Example I was duplicated but clinochlore was used as the catalyst and a yield of 61% of solid camphene was obtained.

The chlorites operable as a catalyst in accordance with this invention are silicates of magnesium of iron, usually occurring in scaly aggregates and being softer than the micas and pliable instead of being elastic. According to Pauling's explanation of the chlorite structure, it consists of alternate mica-like and brucite-like layers. The mica-like layers have a composition varying between $Mg_3(AlSi_3O_{10})(OH)_2$ and $$Mg_2Al(Al_2Si_2O_{10})(OH)_2$$

and the brucite-like layers, the composition $$Mg_2Al(OH)_6.$$

Each of the specific minerals that may be grouped and referred to as the chlorites may be represented by a type structural formula varying from $$[O_6 \cdot AlSi_3 \cdot O_4(OH)_2 \cdot Mg_6 \cdot (OH)_2O_4 \cdot AlSi_3 \cdot O_6]$$
$$[(OH)_6 \cdot Al_2Mg_4 \cdot (OH)_6]$$

to $$[O_6 \cdot Al_2Si_2 \cdot O_4(OH)_2 \cdot Al_2Mg_6 \cdot (OH)_2O_4 \cdot Al_2Si_2O_6]$$
$$\cdot [(OH)_6 \cdot Al_2Mg_4 \cdot (OH)_6].$$

The chlorites also operable in accordance with this invention include those chlorites resulting from isomorphous substitutions in the above type formula where, for instance, $Fe''$ and $Mn''$ may replace $Mg''$ and $Fe'''$ may replace $Al'''$, in six coordination. (See Bragg, "Atomic Structure of Minerals," page 219.) Specific chlorites found especially applicable in accordance with this invention are known by the mineral names, prochlorites, clinochlore, and penninite.

The specific chlorite catalyst, prochlorite, used in Example I may be further characterized as having a hardness (Mohs' scale) of between 1 and 2, a refractive index of 1.58, a small and variable optic axial angle, a feebly pearly luster, and a green color. Prochlorite is further characterized as having flexible laminae, which do not exfoliate appreciably on heating. The other chlorites are similarly characterized.

The chlorites operate as catalysts in the lump or unground form but are preferably used in the ground form for purposes of maximum conversion, convenience of use, and uniformity of reaction. Although reaction rates increase with increase in fineness of the catalyst, little effect of fineness is noticed above a grain size of about 200 mesh.

The novel catalytic conversion of an isomerizable terpene to camphene may be carried out between about 50° C. and about the reflux temperature of the terpene being treated. The preferred operating range is between about 155° C. and about 167° C. at normal atmospheric pressure. Under proper conditions of pressure, temperatures up to 200° C. or higher may be used.

Catalytic conversion of terpene to camphene may be made in a relatively short period of time, when using the chlorite minerals or when using a rock or a mineral product containing essentially the chlorites. When alpha-pinene was isomerized in accordance with the method of Example I, it was found that a 90% conversion of the pinene was effected at the given temperature in 10 minutes to give a yield of about 63% camphene, based on total pinene used. The reaction time may vary between about 10 minutes and about 8 hours. Completeness of isomerization of pinene is desirable. When the reaction is not carried to completeness, unreacted terpenes as, for example, alpha-pinene remain in small percentages and because of the relative closeness of the boiling points of alpha-pinene and camphene, separation by the ordinary methods of fractional distillation is not feasible.

Terpenes that have been found to be isomerizable to camphene by means of the chlorite catalysts are alpha-pinene, beta-pinene, and such pinene-containing materials as gum turpentine, wood turpentine, sulfate turpentine which is obtained in the manufacture of paper from the delignification of wood, etc.

The ratio of chlorite catalyst used to the terpene being treated may vary between about 0.005 and about 0.1 and is preferably between about 0.015 and about 0.025.

The process in accordance with this invention may be carried out as a batch process in liquid or vapor phase or as a continuous process in these same phases.

From the foregoing description, it is apparent that a new method of producing pure camphene in an efficient, effective, and economical manner has been discovered, wherein a terpene capable of being isomerized may be directly converted to camphene in a relatively short period of time by heating the terpene in the presence of a chlorite or a mineral product or rock containing essentially a chlorite.

What I claim and desire to protect by Letters Patent is:

1. The process of isomerizing a pinene-containing material, which comprises heating said material in the presence of a chlorite until isomerization is at least partially complete.

2. The process of isomerizing a pinene, which comprises heating a pinene in the presence of a chlorite until isomerization is at least partially complete.

3. The process of isomerizing a pinene, which comprises heating the pinene in the presence of prochlorite until isomerization is at least partially complete.

4. The process of isomerizing a pinene, which comprises heating the pinene in the presence of penninite until isomerization is at least partially complete.

5. The process of isomerizing a pinene, which comprises heating the pinene in the presence of clinochlore until isomerization is at least partially complete.

6. The process of isomerizing alpha-pinene, which comprises heating alpha-pinene in the presence of a chlorite until isomerization is at least partially complete.

7. The process of isomerizing alpha-pinene, which comprises heating alpha-pinene in the presence of prochlorite until isomerization is at least partially complete.

8. The process of isomerizing alpha-pinene, which comprises heating alpha-pinene in the presence of penninite until isomerization is at least partially complete.

9. The process of isomerizing alpha-pinene, which comprises heating alpha-pinene in the presence of clinochlore until isomerization is at least partially complete.

10. The process of isomerizing turpentine, which comprises heating turpentine in the presence of a chlorite until isomerization is at least partially complete.

11. The process of isomerizing turpentine, which comprises heating turpentine in the presence of prochlorite until isomerization is at least partially complete.

12. The process of isomerizing turpentine, which comprises heating turpentine in the presence of penninite until isomerization is at least partially complete.

13. The process of isomerizing turpentine, which comprises heating turpentine in the presence of clinochlore until isomerization is at least partially complete.

WILLIAM F. CARSON, Jr.

CERTIFICATE OF CORRECTION.

Patent No. 2,382,397.　　　　　　　　　　　　　　　August 14, 1945.

WILLIAM F. CARSON, JR.

It is hereby certified that error appears in the printed specification of the above numbered patent requiring correction as follows: Page 1, second column, line 17, for "of iron" read --and iron--; and that the said Letters Patent should be read with this correction therein that the same may conform to the record of the case in the Patent Office.

Signed and sealed this 20th day of November, A. D. 1945.

Leslie Frazer (Seal)　　　　　　　　First Assistant Commissioner of Patents.